(12) United States Patent
Wang et al.

(10) Patent No.: US 10,276,159 B2
(45) Date of Patent: Apr. 30, 2019

(54) METHODS AND SYSTEMS FOR DETERMINING AND USING A CONFIDENCE LEVEL IN SPEECH SYSTEMS

(71) Applicant: HONEYWELL INTERNATIONAL INC., Morris Plains, NJ (US)

(72) Inventors: Guoqing Wang, Beijing (CN); Chuan Jiang, Beijing (CN); Kai Tian, Beijing (CN); Wei Yang, Beijing (CN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 242 days.

(21) Appl. No.: 15/150,975

(22) Filed: May 10, 2016

(65) Prior Publication Data

US 2017/0330560 A1 Nov. 16, 2017

(51) Int. Cl.
*G10L 15/22* (2006.01)
*G10L 15/183* (2013.01)

(52) U.S. Cl.
CPC ............ *G10L 15/22* (2013.01); *G10L 15/183* (2013.01); *G10L 2015/228* (2013.01)

(58) Field of Classification Search
CPC .............................. G10L 15/22; G10L 15/183
See application file for complete search history.

(56) References Cited

U.S. PATENT DOCUMENTS

| | | | |
|---|---|---|---|
| 7,774,202 B2 | 8/2010 | Spengler et al. | |
| 7,881,832 B2 | 2/2011 | Komer et al. | |
| 8,311,827 B2 | 11/2012 | Hernandez et al. | |
| 8,515,763 B2* | 8/2013 | Dong | G10L 15/22 701/14 |
| 9,824,689 B1* | 11/2017 | Shapiro | G10L 15/22 |
| 2006/0215821 A1* | 9/2006 | Rokusek | G10L 15/22 379/88.01 |
| 2008/0201148 A1* | 8/2008 | Desrochers | G10L 15/00 704/257 |
| 2010/0030400 A1* | 2/2010 | Komer | G10L 15/26 701/3 |

(Continued)

FOREIGN PATENT DOCUMENTS

EP 2770201 A1 8/2014

OTHER PUBLICATIONS

Extended EP Search Report for Application No. 171663933-1901 dated Sep. 14, 2017.

(Continued)

*Primary Examiner* — Douglas Godbold
(74) *Attorney, Agent, or Firm* — Lorenz & Kopf, LLP

(57) ABSTRACT

Methods and systems are provided for processing speech inputs for a controlling one or more vehicle systems of a vehicle. In one embodiment, a method includes: receiving speech input from an audio channel; performing, by a processor, speech recognition on the speech input to obtain recognized results; determining, by a processor, an accuracy level of the audio channel based on a comparison of the recognized results and predictive phraseology; determining, by a processor, an integrity level of the audio channel based on situational awareness information; communicating the recognized results, accuracy level, and the integrity level to a vehicle system; and selectively using the recognized results by the vehicle system based on the accuracy level and the integrity level.

19 Claims, 4 Drawing Sheets

(56) References Cited

U.S. PATENT DOCUMENTS

| | | | | |
|---|---|---|---|---|
| 2011/0125503 | A1* | 5/2011 | Dong | G10L 15/22 |
| | | | | 704/275 |
| 2015/0217870 | A1* | 8/2015 | McCullough | G08G 5/0021 |
| | | | | 704/275 |
| 2016/0379640 | A1* | 12/2016 | Joshi | G10L 15/22 |
| | | | | 704/235 |
| 2017/0123757 | A1* | 5/2017 | Lancaster | B60R 16/0373 |

OTHER PUBLICATIONS

Wesson, R.B. et al; Voice-Activated Cockpit for General Aviation; Final Report for SBIR Contract # DTRT57-06-C-10009, May 24, 2006.

* cited by examiner

METHODS AND SYSTEMS FOR DETERMINING AND USING A CONFIDENCE LEVEL IN SPEECH SYSTEMS

TECHNICAL FIELD

The technical field generally relates to speech systems, and more particularly relates to methods and systems for determining a confidence level of voice recognition.

BACKGROUND

Vehicle speech systems perform speech recognition on speech uttered by an occupant of the vehicle. The speech utterances typically include commands that control one or more features of the vehicle or other systems accessible by the vehicle. Conventional speech systems utilize generic recognition techniques such that speech utterances from any occupant of the vehicle can be recognized. Speech dialog systems manage a dialog with a user of the vehicle based on the commands. The dialog is typically generic for all users.

However, modern voice recognition software in and of itself may not be able to address the varying levels of hardware and software criticality due to the performance stability of voice recognition, and its vulnerability to environmental interference. For example, different pilot voice characteristics may contribute to non-inconsistent recognition performance, different flight phases with different vehicle configurations may result in variable acoustical noise spectrums, different distance to the radio station imposes statics differently on the signal, etc. A method for generating a reliable voice recognition output accuracy and/or integrity level would provide an indication to the specific consumer functionality whether or not the data is eligible to be applied as input in terms of its criticality.

Accordingly, it is desirable to provide methods and systems for determining a confidence level of voice recognition. It is further desirable to provide the confidence level in terms of accuracy and integrity. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for processing speech inputs for a controlling one or more vehicle systems of a vehicle. In one embodiment, a method includes: receiving speech input from an audio channel; performing, by a processor, speech recognition on the speech input to obtain recognized results; determining, by a processor, an accuracy level of the audio channel based on a comparison of the recognized results and predictive phraseology; determining, by a processor, an integrity level of the audio channel based on situational awareness information; communicating the recognized results, accuracy level, and the integrity level to a vehicle system; and selectively using the recognized results by the vehicle system based on the accuracy level and the integrity level.

In another example, a system includes a non-transitory computer readable medium. The non-transitory computer readable medium includes a first module that performs, by a processor, speech recognition on a speech input received from an audio channel to obtain recognized results. The non-transitory computer readable medium further includes a second module that determines, by a processor, an accuracy level of the audio channel based on a comparison of the recognized results and predictive phraseology. The non-transitory computer readable medium further includes a third module that determines, by a processor, an integrity level of the audio channel based on situational awareness information, and that communicates the recognized results, the accuracy level, and the integrity level to a vehicle system.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
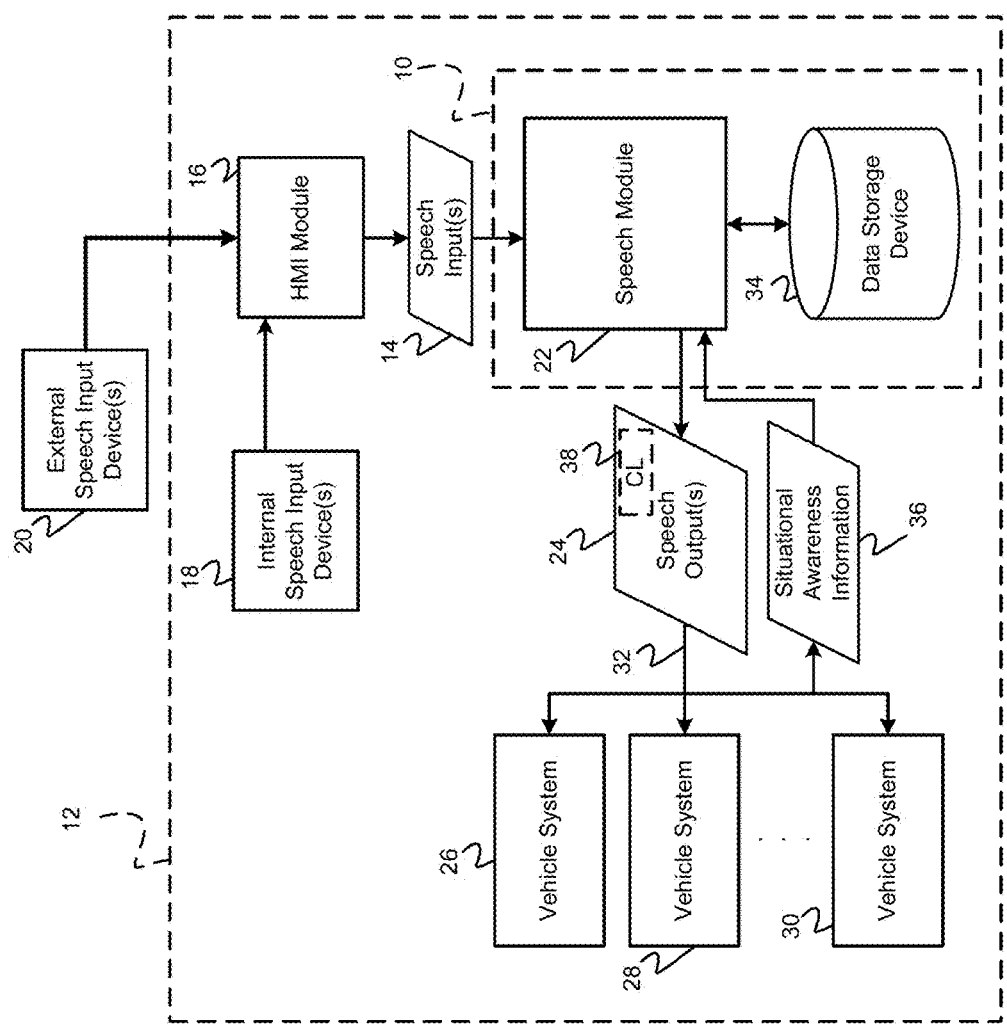
FIG. 1 is a functional block diagram of a vehicle that includes a speech system in accordance with various exemplary embodiments.

With initial reference to FIG. 1, in accordance with exemplary embodiments of the present disclosure, a speech system 10 is shown to be included within a vehicle 12. As discussed in the exemplary embodiments herein, the vehicle 12 is an aircraft. As can be appreciated, the vehicle 12 can be an automobile, a watercraft, a sport utility vehicle, or any other type of vehicle or speech related application and is not limited to the present examples.

The speech system 10 is configured to provide speech recognition capability for speech inputs 14 received through a human machine interface (HMI) module 16. The HMI module 16 receives speech input directly from a user through an internal input device(s) 18 (e.g., a microphone present within the cockpit or other location of the vehicle), and/or indirectly, for example, from other users through an external input device(s) 20 that communicates speech signals to the vehicle 12 (e.g., an air traffic controller (ATC), radio broadcasts, etc.).

The speech system 10 includes a speech module 22 that provides recognized speech output 24 to one or more vehicle systems 26-30. Provided the aircraft example, such vehicle systems 26-30 can include, for example, but are not limited to, flight management systems, control systems, display systems, communication systems, navigation systems, or any other aircraft system that may include a speech dependent application. As can be appreciated, one or more embodiments of the speech system 10 can be applicable to other non-vehicle systems having speech dependent applications and thus, is not limited to the present vehicle example. For exemplary purposes, the speech system 10 will be discussed in the context of the vehicle example.

In various embodiments, the speech system 10 communicates with the multiple vehicle systems 26-30 directly through a communication bus and/or other communication means 32 (e.g., wired, short range wireless, or long range wireless) and/or indirectly through the HMI module 16 (flow not shown). As can be appreciated, in various other embodiments not shown, the speech system 10 and/or HMI module 16 may be combined, and/or may be integrated with one or more of the vehicle systems 26-30.

Generally speaking, the speech system 10 validates speech inputs 14 periodically and/or upon events with predictive phraseology stored in a data storage device 34 and/or vehicle situational information 36 received from one or more of the vehicle systems 26-30, such that a confidence level 38 can be determined and associated with the speech output 24. The confidence level 38 is then made available to consumer functions of the vehicle systems 26-30. The eligibility of certain voice recognition enabled features of the vehicle systems 26-30 can thus, be determined according to their criticality to the flight safety, equipment operation/interaction procedures, or other factors.

Figure 2:
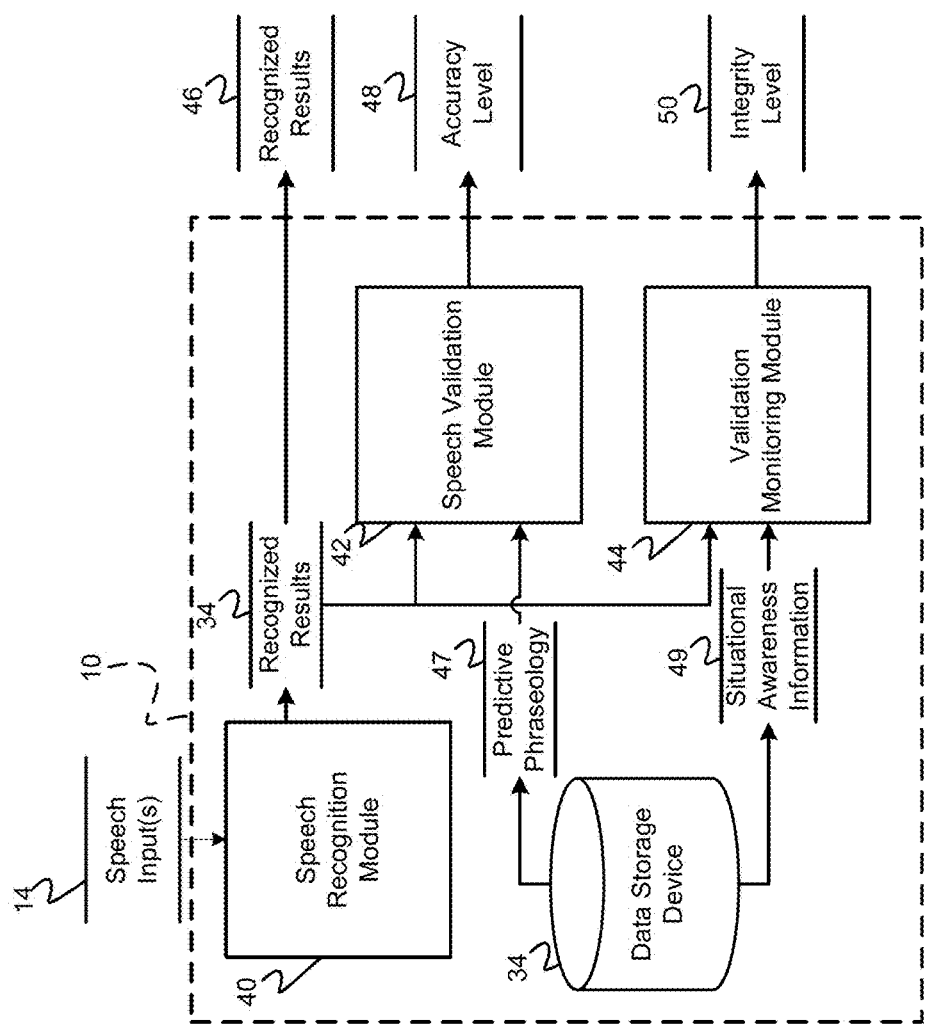
FIG. 2 is a dataflow diagram illustrating the speech system in accordance with various exemplary embodiments.

Referring now to FIG. 2, a dataflow diagram illustrates the speech module 22 of the speech system 10 in accordance with various embodiments. As can be appreciated, various embodiments of speech module 22, according to the present disclosure, may include any number of sub-modules. For example, the sub-modules shown in FIG. 2 may be combined and/or further partitioned to similarly validate speech inputs and generate the confidence level 38. In various embodiments, the speech module 22 includes a speech recognition module 40, a speech validation module 42, and a validation monitoring module 44. As can be appreciated, the modules of speech system 10 can be implemented all on the vehicle 12 or part on the vehicle 12 and part on a remote system such as a remote server (not shown).

The speech recognition module 40 receives and processes the speech input 14 from the HMI module 16. For example, speech inputs 14 from one or more audio channels (e.g., radio TX/RX channels, intercom, etc.) are fed from the HMI module 16 (or other audio inputs) to the speech recognition module 40. The speech recognition module 40 performs one or more speech recognition methods on the speech inputs 14 and produces recognized results 46 including for example, a digitalized output (e.g., in textual, and/or binary representations).

The speech validation module 42 receives the recognized results 46 and validates the recognized results 46. In various embodiments, the validation is performed for each channel. For example, the speech validation module 42 computes an accuracy level 48 (AL) of the recognized result 46 from a particular channel and associates a tag indicating the AL 48 to all messages associated with the particular channel. The AL 48 can be computed, for example, by comparing the content (e.g., codes, words, phrases, etc.) of the recognized results 46 to expected content and assigning a level (numeric or other descriptive level) based on the comparison. The expected content can be determined from predictive phraseology 47 retrieved from one or more information databases, procedural models, communication protocols, etc. stored in the data storage device 34.

In various embodiments, the speech validation module 42 maintains the AL 48 for the associated channel until a time elapses or an event occurs and is recognized as impacting the recognition. The event can include, for example, but is not limited to, an event that causes a change in the noise level, a change in speaker, turbulence or other environmental condition, distance from the transmitter, etc.

The validation monitoring module 44 receives the recognized results and any other required information and determines an integrity level (IL) 50 for the validated recognized results. The validation monitoring module associates a tag indicating the IL 50 with all messages associated with the particular channel. The IL 50 can be computed, for example, by comparing the content of the recognized results to expected content and assigning a level based on the comparison. The expected content can be determined from situational awareness information 49 such as current vehicle configuration settings, situational data, etc. retrieved from the data storage device 34.

Figure 3:
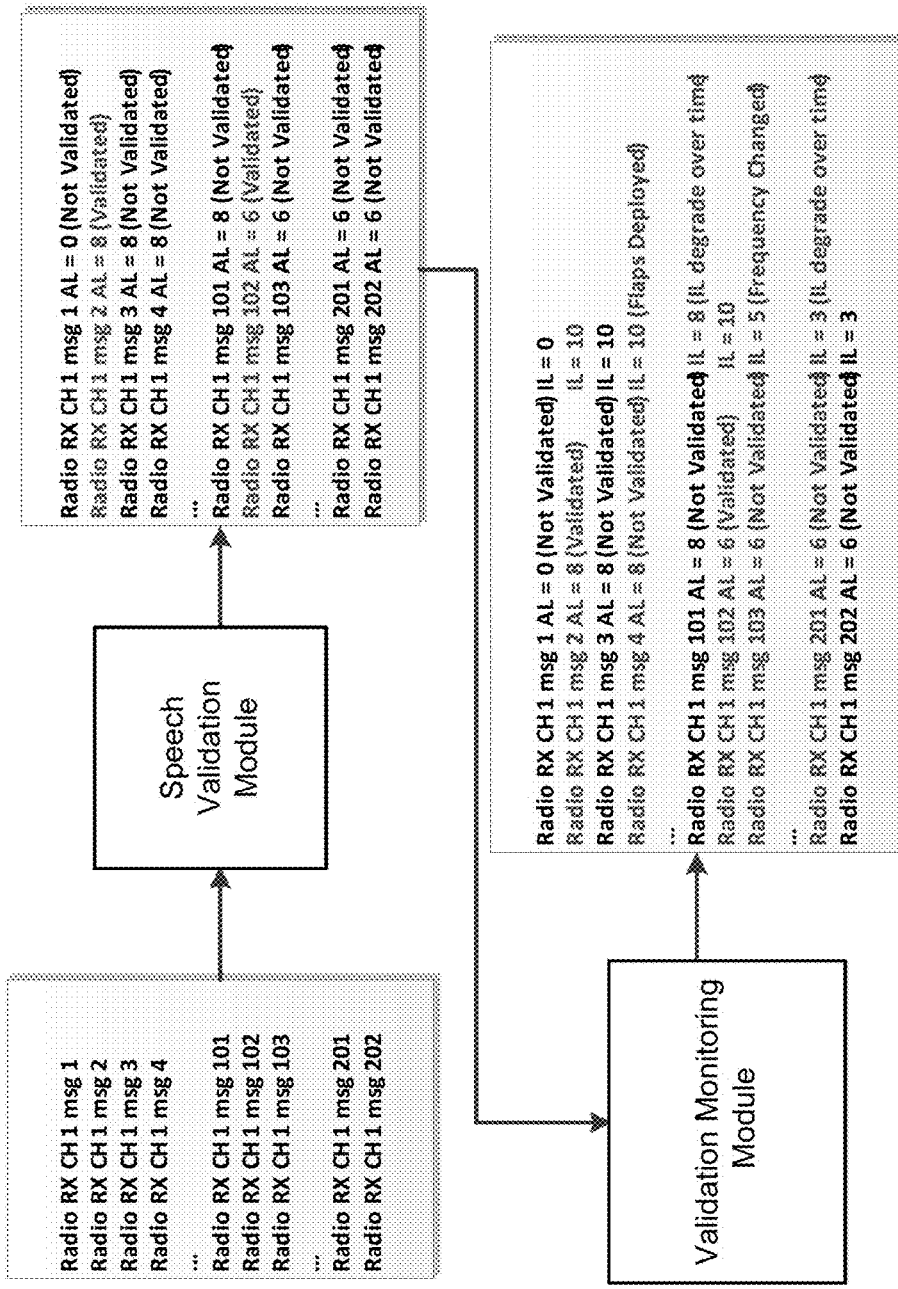
FIG. 3 illustrates exemplary data associated with the speech system in accordance with various embodiments.

As shown in FIG. 3, the AL 48 and IL 50 are then provided along with the digitized output of the recognized results 46 to consumer functions of the vehicle systems 26-30. The AL 48 and IL 50 act as the indicators for the confidence level 38. In various embodiments, the validation monitoring module 44 includes a descriptive label with with the tag. The descriptive label indicates the cause for the updating of the IL 50. For example, the descriptive label can indicate the situational awareness information that changed or that caused or did not cause the updating of the IL 50.

In various embodiments, the IL 50 is reset upon validation, and the IL 50 degrades over time and based on events which affect the channel, e.g., frequency change for a radio RX channel. For events or situation changes that don't significantly impact the given channel, the IL 50 may maintain its value, e. g., flaps deployment which changes cockpit noise level but has less impact to RX radio channel.

Figure 4:
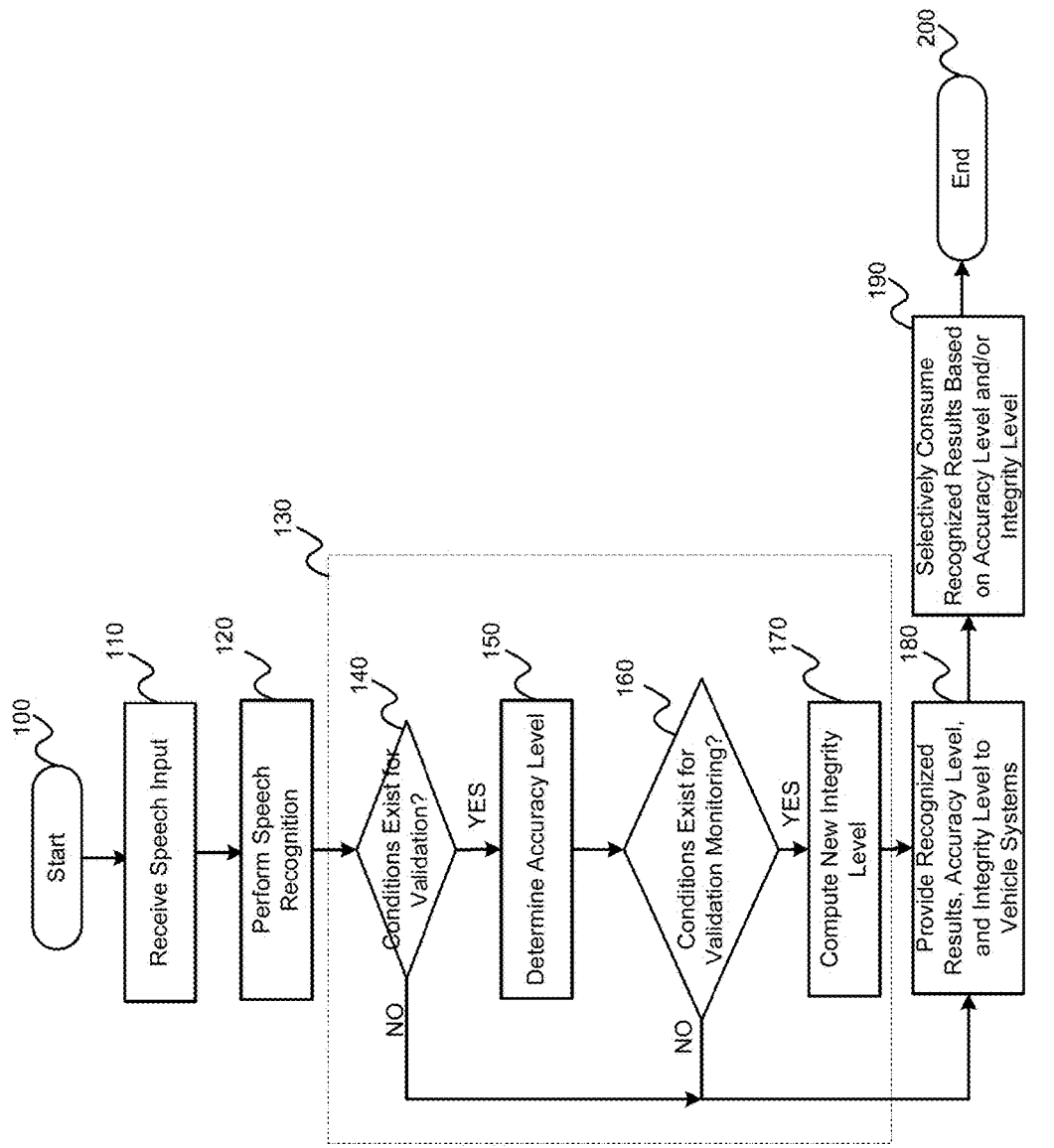
FIG. 4 is a flowchart illustrating an exemplary speech method that may be performed by the speech system in accordance with various embodiments.

Referring now to FIG. 4 and with continued reference to FIGS. 1-3, a flowchart illustrates speech recognition and validation methods that may be performed by the speech system 10 in accordance with various exemplary embodiments. As can be appreciated in light of the disclosure, the order of operation within the methods is not limited to the sequential execution as illustrated in FIG. 4, but may be performed in one or more varying orders as applicable and in accordance with the present disclosure. As can further be appreciated, one or more steps of the methods may be added or removed without altering the spirit of the method.

In one example, the method may begin at 100. The speech input 14 is received at 110 and speech recognition is performed on the speech input 14 at 120. The confidence level 38 is then selectively computed for the source of the speech input at 130. For example, the accuracy level 48 and the integrity level 50 can be computed separately at 150 and 170 respectively. In various embodiments, the accuracy level 48 can be computed if, for example, one or more conditions exist (e.g., an occurrence of an event, a time lapse, and/or a certain phrase identified in the recognized results) for updating the confidence level 38 at 140. The accuracy level 48 can be computed by comparing the content with expected content defined by, for example, by communication protocols, procedural manuals, information databases, etc.

The integrity level 50 can be computed if, for example, one or more conditions exist (e.g., an occurrence of an event, a time lapse, and/or a certain phrase identified in the recognized results) for updating the integrity level 50 at 160. The integrity level 50 can be computed based on the context of the speech input as indicated by the current configuration settings of the vehicle, and/or situational data provided by the vehicle or remote systems. The AL 48 and IL 50 are then provided along with the digitized output to consumer functions of the vehicle systems at 180. The AL 48 and IL 50 are then evaluated by the consumer functions to selectively determine whether to rely on the speech input at 190. Thereafter, the method may end at 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of validating speech inputs for controlling one or more vehicle systems of a vehicle, comprising:
    validating the speech inputs periodically and upon events by using predictive phraseology stored in a data storage device of the vehicle, and by using situational information received by the one or more vehicle systems to determine eligible voice features of the vehicle by:
    receiving speech input from an audio channel;
    performing, by a processor, speech recognition on the speech input to obtain recognized results wherein the speech input has not yet been validated;
    determining by the processor whether one or more conditions exist related to the speech input in order to validate the speech input wherein if the one or more conditions exist then validating an accuracy and an integrity of an audio channel of the speech input by:
    determining for validating the accuracy of the audio channel, by a processor, an accuracy level of the audio channel based on whether the one or more conditions exist for updating a confidence level of a speech output and by computing a comparison of the recognized results and the predictive phraseology in order to assign a descriptive level to the audio channel based on the comparison, and
    determining for validating the integrity of the audio channel, by a processor, an integrity level of the audio channel based on the context of the speech input as indicated by current configuration settings of the vehicle and on situational awareness information provided by the vehicle or remote systems by:
    computing a comparison of the content of the speech input to an expected content, and assigning the integrity level based on the computed comparison for associating a tag indicative of the integrity level of the audio channel with messages of the audio channel;
    communicating descriptive labels with the recognized results, accuracy level, and the integrity level to the vehicle system wherein the descriptive labels are associated with the tag indicative of the accuracy level and integrity level of the audio channel; and
    selectively using the recognized results by the vehicle system based on the accuracy level and the integrity level to determine the eligible voice features of the vehicle.

2. The method of claim 1, wherein the determining the integrity level is performed based on the performance of the determining the accuracy level.

3. The method of claim 2, further comprising maintaining the accuracy level while updating the integrity level.

4. The method of claim 3, further comprising determining the descriptive label based on a cause for the update in the integrity level.

5. The method of claim 3, further comprising determining the descriptive label based on the situational awareness information.

6. A system for validating speech inputs for controlling one or more vehicle systems of a vehicle, comprising:
    a non-transitory computer readable medium comprising:
        a first module that performs, by a processor, speech recognition on a speech input received from an audio channel to obtain recognized results;
        a second module that validates the speech input by a determination, by a processor, of an accuracy level of the audio channel based on whether one or more conditions exist for updating a confidence level of a speech output and by a computation of a comparison of the recognized results and predictive phraseology for an assignment of a numeric value based on the comparison; and
        a third module that further validates the speech input by a determination, by a processor, of an integrity level of the audio channel based on the context of the speech input as indicated by current configuration settings of the vehicle and on situational awareness information provided by the vehicle or remote systems by: a computation of a comparison of the content of the speech input to an expected content, and an assignment of the integrity level based on the computed comparison in order to communicate the recognized results, the accuracy level, and the integrity level to a vehicle system to selectively determine eligible voice features of the vehicle.

7. The system of claim 6, further comprising a vehicle system that receives the recognized results, accuracy level, and the integrity level and that selectively uses the recognized results based on the accuracy level and the integrity level.

8. The system of claim 6, wherein the third module performs the determining of the integrity level based on the performance of the determining the accuracy level.

9. The system of claim 8, wherein the second module further maintains the accuracy level while the third module further updates the integrity level.

10. The system of claim 6, wherein the third module associates a descriptive label with the integrity level, and communicates the descriptive label to the vehicle system.

11. The system of claim 10, wherein the third module determines the descriptive label based on a cause for the update in the integrity level.

12. The system of claim 10, wherein the third module determines the descriptive label based on the situational awareness information.

13. An aircraft, comprising:
    a speech input device that receives speech from a user;
    a plurality of speech dependent aircraft systems that validate the speech from the user periodically and upon events by using predictive phraseology, and by using situational information received by the speech dependent aircraft systems to determine eligible voice enabled features of the aircraft; and
    a non-transitory computer readable medium, comprising:

a first module that performs, by a processor, speech recognition on a speech input received from an audio channel to obtain recognized results;

a second module that validates the speech input by a determination, by a computation by a processor, of an accuracy level of the audio channel based on whether any of the one or more conditions exist for updating a confidence level of a speech output and by a comparison of the recognized results and the predictive phraseology; and a third module that further validates the speech input by a determination, by a processor, of an integrity level of the audio channel based on situational awareness information provided by the vehicle or remote systems by: a computation by the processor of a comparison of content of the speech input to an expected content, and assigning the integrity level based on the computed comparison in order to communicate the recognized results, the accuracy level, and the integrity level to a vehicle system to selectively determine eligible speech dependent aircraft systems.

14. The aircraft of claim 13, wherein the at least one of the plurality of speech dependent aircraft systems selectively uses the recognized results based on the accuracy level and the integrity level.

15. The aircraft of claim 13, wherein the third module performs the determining of the integrity level based on the performance of the determining the accuracy level.

16. The aircraft of claim 15, wherein the second module further maintains the accuracy level while the third module further updates the integrity level.

17. The aircraft of claim 13, wherein the third module associates a descriptive label with the integrity level, and communicates the descriptive label to the at least one of the plurality of speech dependent aircraft systems.

18. The aircraft of claim 17, wherein the third module determines the descriptive label based on a cause for the update in the integrity level.

19. The aircraft of claim 17, wherein the third module determines the descriptive label based on the aircraft situational awareness information.

* * * * *